(12) United States Patent
Sternberg et al.

(10) Patent No.: US 6,241,247 B1
(45) Date of Patent: Jun. 5, 2001

(54) REMOTE CONTROL WITH VENTILATION HOLES

(76) Inventors: Aaron Sternberg, 485 Upper La Vista Ct. NW., Salem, OR (US) 97304-4704; Noah T. Ullman, 105 Lattingtown Rd., Glen Cove, NY (US) 11542

( * ) Notice: Subject to any disclaimer, the term of this patent is extended or adjusted under 35 U.S.C. 154(b) by 0 days.

(21) Appl. No.: 09/322,802

(22) Filed: May 27, 1999

Related U.S. Application Data

(60) Provisional application No. 60/087,100, filed on May 28, 1998.

(51) Int. Cl.⁷ .................................................. A63B 71/00
(52) U.S. Cl. ......................................................... 273/148 B
(58) Field of Search ....................... 273/148 B; 473/550; 463/46, 47, 36, 37, 38; D14/454

(56) References Cited

U.S. PATENT DOCUMENTS

| | | |
|---|---|---|
| D. 335,150 | 4/1993 | Biagi et al. . |
| D. 338,053 | 8/1993 | Underhill et al. . |
| D. 342,762 | 12/1993 | Wing . |
| D. 362,692 | 9/1995 | Rissman et al. . |
| 4,082,276 * | 4/1978 | Szafianski ........................ 473/550 |
| 4,407,500 * | 10/1983 | Hofmann ......................... 473/550 |
| 4,519,097 * | 5/1985 | Chappell, Jr. et al. ...... 273/148 B X |
| 4,533,139 * | 8/1985 | Goldin et al. ..................... 473/550 |
| 4,751,872 | 6/1988 | Lawson, Jr. . |
| 4,985,804 | 1/1991 | Campbell et al. . |
| 5,018,733 * | 5/1991 | Buand ............................... 473/550 |
| 5,046,739 | 9/1991 | Reichow . |
| 5,501,458 | 3/1996 | Mallory . |
| 5,615,085 * | 3/1997 | Wakabayashi et al. .......... 361/702 |
| 5,636,103 | 6/1997 | Bushner . |
| 5,638,342 * | 6/1997 | Kartsotis et al. ................. 368/282 |
| 5,645,277 | 7/1997 | Cheng . |
| 5,648,798 | 7/1997 | Hamling . |
| 5,669,835 * | 9/1997 | Tiura ................................ 473/550 |

\* cited by examiner

*Primary Examiner*—Raleigh W. Chiu
(74) *Attorney, Agent, or Firm*—Stoel Rives LLP

(57) ABSTRACT

A controller for manipulating icons on a video display is provided to reduce or substantially eliminate perspiration on the user's hands during extended use. The controller includes a housing with finger operated buttons that control the video game. The housing includes ventilation holes to allow air to circulate through the controller and between the housing and the user's hands. The housing encloses electronic components that are contained in a protective package that can be removed from the housing so that it can be easily and thoroughly cleaned. The ventilation holes may be located over the entire housing or may be located only at locations on the housing that are intended to be grasped by the user.

5 Claims, 2 Drawing Sheets

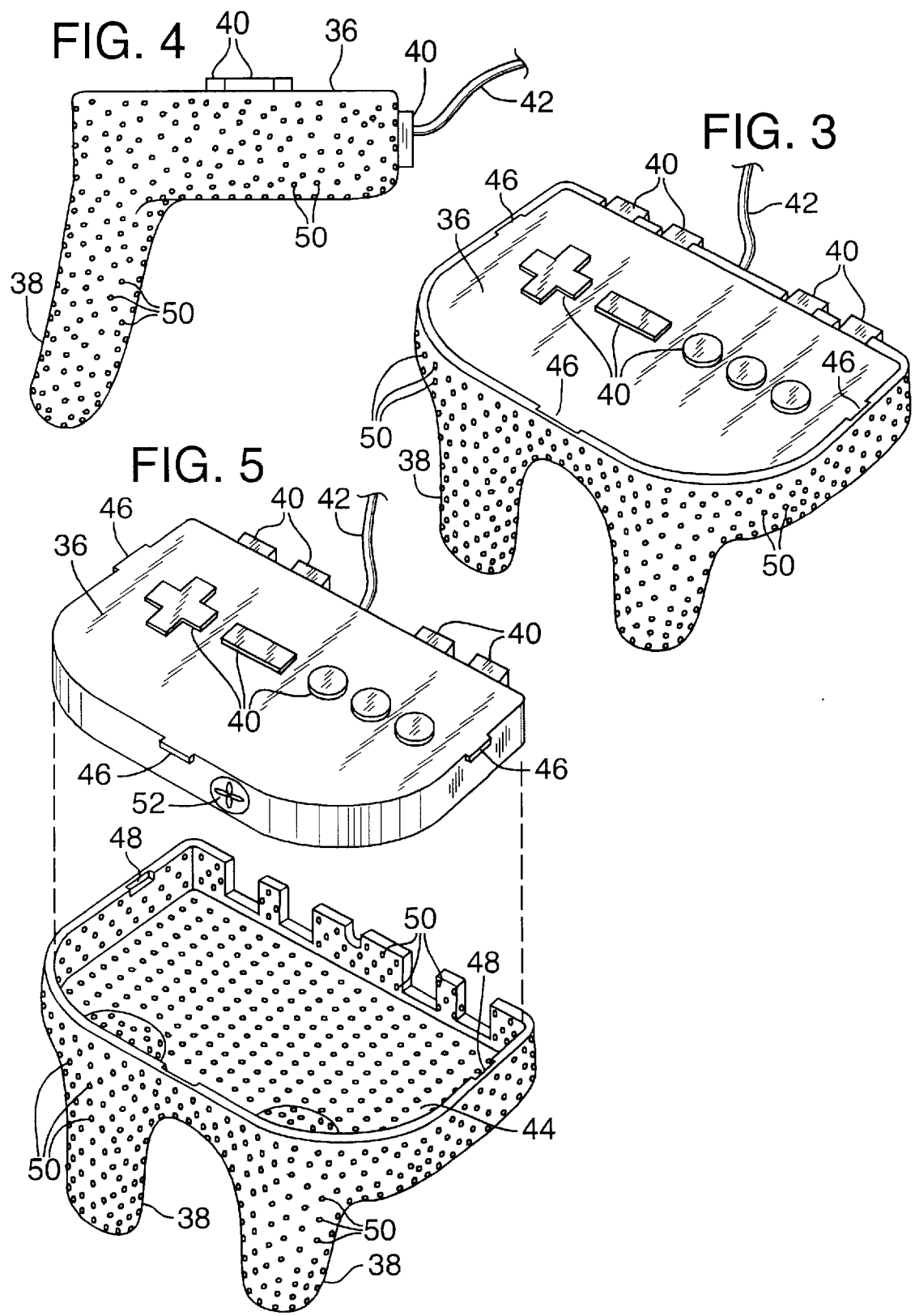

REMOTE CONTROL WITH VENTILATION HOLES

This application claims benefit of Provisional Application 60/087,100, filed May 28, 1998.

TECHNICAL FIELD

This invention is directed to hand-held controllers such as controllers used to manipulate icons on a video screen and, more particularly to a controller that is ventilated to keep a user's hand dry and prevent perspiration.

BACKGROUND OF THE INVENTION

There are many types of hand-held controllers for electronic video games and portable electronic games. For example, one type of remote control is one which includes a housing with finger controls and is generally connected to a television or video screen by a cable. The housing is typically rectangular or square and is held so that the control buttons are within easy reach of the user's fingers and/or thumbs. Some remote controls may include handles or trigger grips. Most of the current controllers are usually made of hard plastic and may have a smooth surface. Alternatively, they may have a textured surface to enhance the gripping. Examples of such controllers can be seen in U.S. Pat. Nos. 5,645,277, 5,046,739, Des. Pat. No. 362,692, Des. Pat. No. 342,762, and Des. Pat. No. 335,150.

However, users often hold the controllers for extended periods of time causing the hands to perspire. Perspiration may reduce the user's grip and may cause the controller to slip. Additionally, perspiration may simply create an uncomfortable feel for the user, promotes dirt build-up and contributes to the overall uncleanliness of the controller. Some controllers have attempted to overcome this problem by providing an absorbent material to wrap around or cover the controller. For example, U.S. Pat. No. 5,501,458 discloses such a cover for an electronic game controller. The cover is attached to the controller by a hook and loop fasteners. However, while this cover may be effective for absorbing perspiration it does nothing to prevent the hands from perspiring.

SUMMARY OF THE INVENTION

The present invention provides a controller that substantially eliminates the above-described problems by reducing or preventing perspiration build-up. The remote controller includes a housing with finger operated buttons that transmit signals to a video screen. This may be accomplished by wireless transmissions or through a cable. The controller may also be in the form of a computer mouse or a controller typically used with video games. The controller may further be in the form of a joy stick. In order to reduce perspiration build-up, the remote controller of the present invention includes ventilation holes to allow air to circulate through the housing. The ventilation holes may be located over the entire surface of the housing so that no matter where the user holds the housing the ventilation holes will be adjacent the users' hands. The housing encloses electronic components that are contained in a protective package that can be removed from the housing so that it can be easily and thoroughly cleaned. Alternatively, the ventilation holes may be located only at locations on the housing that are intended to be grasped by the user.

In another embodiment, the controller includes detachable handles that the user grips during use. The detachable handles include ventilation holes to allow air circulation as described above. The controller is preferably interchangeable with various detachable handles having ventilation holes that can be used for special marketing or handles of various sizes that can be adapted to the user's hand. For example, handles adapted for standard adult-sized hands may be attached to the controller housing for use by adults or teenagers. For smaller children, smaller handles adapted for standard child-sized hands may be attached to the controller housing. The detachable handle includes a portion that fits over or covers a part of the controller housing, such as a bottom portion. The detachable handle can be attached to the controller housing by any number of ways, including a snap-on attachment, friction fit or screws. This type of handle is especially adapted for controllers that have control buttons on a side of the housing facing away from the user. With this type of remote controller housing the user will typically hold the handles and wrap his or her hand around the remote controller housing to reach the control buttons. Thus, the detachable handles prevent perspiration build-up by providing air flow between the remote controller housing and the user's hand. In order to ensure adequate air flow a fan may be provided within the handle or cover portion. The fan may be connected to a power source within the controller housing.

Another aspect of the invention is that a membrane material may be located at an inner surface of the controller housing or the handle and cover portion to protect the electronic component package from dirt and other contaminants.

Additional objects and advantages of this invention will be apparent from the following detailed description of preferred embodiments thereof which proceeds with reference to the accompanying drawings.

BRIEF DESCRIPTION OF THE DRAWINGS

FIG. 3 is a perspective view of another embodiment of the invention.

FIG. 4 is a side view of the controller of FIG. 3.

FIG. 5 is an exploded perspective view of the controller of FIG. 3.

DETAILED DESCRIPTION OF PREFERRED EMBODIMENT

Figure 1:
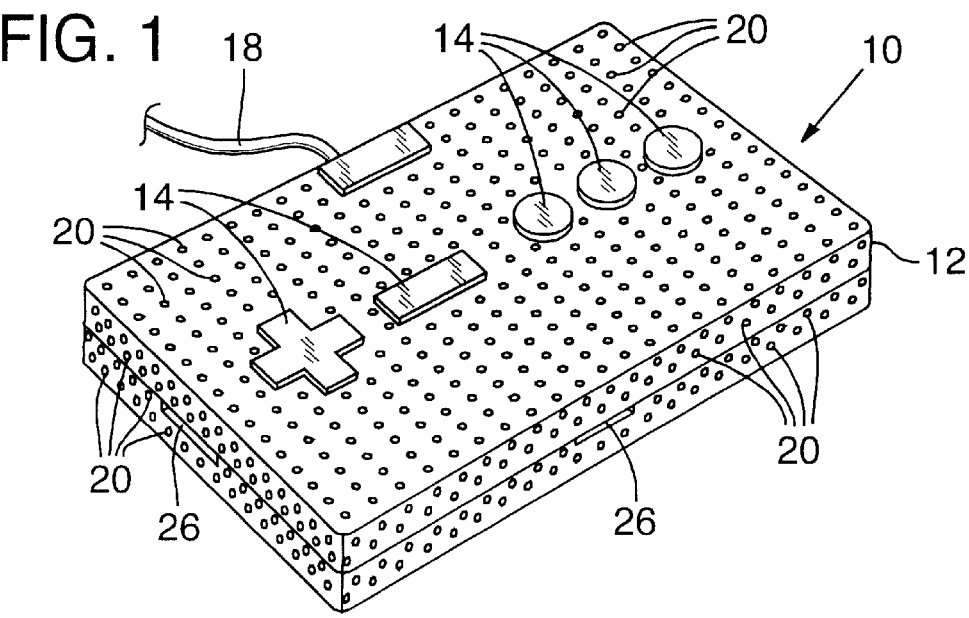
FIG. 1 is a perspective view of the controller of the present invention.
Figure 2:
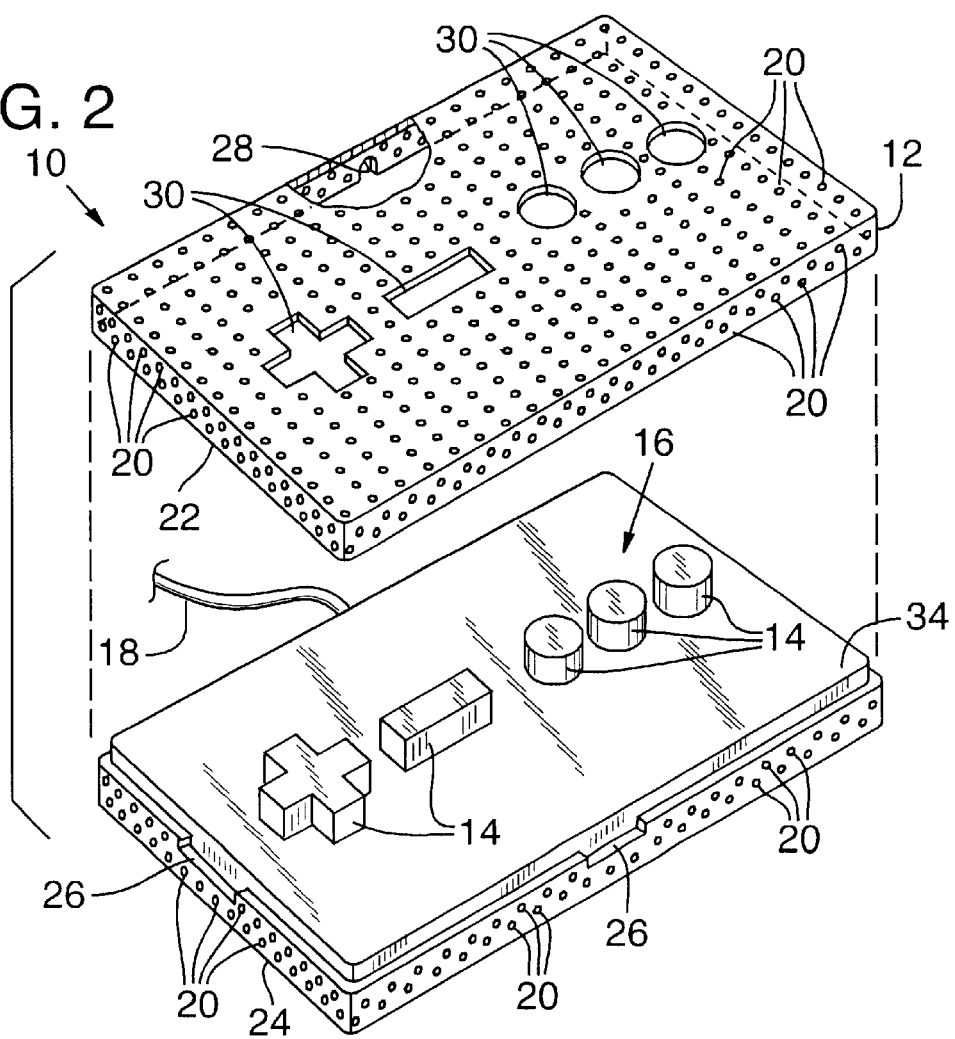
FIG. 2 is a view similar to FIG. 1 showing the controller opened.

A controller 10 for manipulating an icon on a video screen is shown in FIGS. 1 and 2 comprising a housing 12 with control buttons 14. The user manipulates the control buttons 14 which act through electronic components 16 to send signals through a cable 18 to a video screen (not shown). The controller may also be in the form of a computer mouse. Furthermore, although the controller 10 is shown with cable 18 the controller may be a wireless type of controller or a joy stick. The user may hold the controller 10 in any convenient manner so that the control buttons 14 are easily accessible. The housing 12 includes ventilation holes 20 over the entire surface to allow air to circulate through the housing 12 and between the user's hands and the housing 12.

The housing 12 is preferably made of a durable plastic and is separable into plural sections. The controller 10 as shown has a top section 22 and a bottom section 24 that are separable. The top and bottom sections 22 and 24 have tabs 26 that allow the top and bottom sections 22 and 24 to snap together and easily unsnap to separate. The top and bottom sections 22 and 24 have a notch 28 for accommodating the cable 18. The top section 22 includes openings or cutouts 30 for the control buttons 14 that extend above the surface of the top section 22 when the top and bottom sections 22 and 24 are connected. If desired, the top and bottom sections 22 and 24 can be further held together by a clip 32. The controller 10 may be separable in various ways and may be separable into more than two sections.

Therefore, the ventilation holes 20 prevent the user's hands from perspiring during extended use by promoting air flow between the user's hands and the housing 12. Over time the controller 10 may become dirty due to, for example, dirt or food residue. At this time the housing 12 may be disassemble and the electronic components 16 removed so that the housing sections can be washed and thoroughly cleaned. After cleaning, the electronic components 16 can be replaced in the housing 12 which is then re-assembled so that the controller 10 is ready for use.

The controller housing 12 is shown as being rectangular but it is contemplated that it could be in a variety of shapes. Furthermore, the ventilation holes 20 are shown as being located over the entirety of the housing 12. However, the ventilation holes 20 could be located only at areas intended to be held by the user. For example, in the embodiment shown in FIGS. 1 and 2 the ventilation holes 20 may be located only at the left and right sides of the housing 12 since that is the most likely place the user will hold the housing 12. Additionally, the electronic components 16 are shown as being enclosed within a protective covering 34 such as plastic. If desired, the electronic components 16 can be further protected by a membrane material placed on the inside surfaces of the housing 12. This material allows air flow and is removable so that it can be cleaned.

FIGS. 3–5 show another embodiment of the invention in which the controller is composed of a housing 36 and a detachable handle section 38. The housing 36 includes control buttons 40 on the top surface and may include similar buttons on a back side of the housing 36. A cable 42 connects the housing 36 electronically to a video screen (not shown) in a manner similar to that described above. The handle section 38 has a cavity 44 within which the housing 36 is placed. The housing 36 includes tabs 46 that cooperate with tabs 48 of the handle section 38 to allow the housing 36 to be connected to the handle section 38 through a snap fit. The handle section 38 has ventilation holes 50 over its surface to promote air flow between the user's hands and the handle section 38 as described above to prevent perspiration build-up during extended use. The housing 36 may include a fan 52 connected to a power source within the housing 36 to promote air flow. If the handle section 38 becomes dirty from use the housing 36 can be unsnapped from the handle section 38 so that it can be cleaned.

It will be obvious to those having skill in the art that many changes may be made to the details of the above-described embodiment of this invention without departing from the underlying principles thereof. The scope of the present invention should, therefore, be determined only by the following claims.

What is claimed is:

1. A hand-held remote control device for controlling images on a video screen, comprising:

a housing containing electronic components for controlling the images on the video screen, the housing having first and second sections that are separable to provide access to the electronic components, the first and second sections having an outer surface for gripping and an inner surface adjacent the electronic components and ventilation holes to promote air flow, and a membrane material located on the inner surface of the first and second sections between the inner surface of the first and second sections and the electronic components to prevent dirt and other build-up due to use from passing through the ventilation holes to the electronic components.

2. The hand-held device of claim 1 wherein the membrane material allows air to flow through the housing and ventilation holes.

3. The hand-held device of claim 1 wherein the membrane material is removable for cleaning.

4. A hand-held remote control device for controlling images on a video screen, comprising:

a housing containing electronic components and control elements for controlling the images on the video screen, a detachable handle having ventilation holes to permit air flow, and a device within the housing to promote air flow through the handle.

5. The hand-held device of claim 4 wherein the device to promote air flow through the handle is a fan located within the housing.

* * * * *